United States Patent
Ishii et al.

(10) Patent No.: US 7,407,293 B2
(45) Date of Patent: *Aug. 5, 2008

(54) PROJECTION TYPE IMAGE DISPLAY UNIT

(75) Inventors: Koji Ishii, Osaka (JP); Takashi Ikeda, Osaka (JP); Hideyuki Kanayama, Kyoto (JP); Yasuo Funazou, Nara (JP); Takashi Miwa, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/538,512

(22) PCT Filed: Dec. 11, 2003

(86) PCT No.: PCT/JP03/15911

§ 371 (c)(1),
(2), (4) Date: Jun. 9, 2005

(87) PCT Pub. No.: WO2004/053590

PCT Pub. Date: Jun. 24, 2004

(65) Prior Publication Data

US 2006/0017889 A1   Jan. 26, 2006

(30) Foreign Application Priority Data

Dec. 12, 2002  (JP) .............................. 2002-361140

(51) Int. Cl.
G03B 21/18   (2006.01)
G03B 21/16   (2006.01)
G02F 1/1333  (2006.01)
H04N 5/74    (2006.01)
B03C 3/41    (2006.01)
B03C 3/45    (2006.01)

(52) U.S. Cl. ............................. 353/57; 353/55; 353/60; 353/61; 349/161; 348/748; 96/95; 96/98

(58) Field of Classification Search .................... 353/57, 353/52, 55, 58, 60, 61; 349/161, 748; 96/95, 96/97, 98
See application file for complete search history.

(56) References Cited

U.S. PATENT DOCUMENTS 3,899,684 A * 8/1975 Tenney .................. 422/186.11

(Continued)

FOREIGN PATENT DOCUMENTS

| EP | 1 489 458 A1 | 12/2004 |
|----|---|---|
| JP | 8-17356 | 1/1996 |
| JP | 2001-068293 | * 3/2001 |
| JP | 2001-222065 | 8/2001 |
| JP | 2001-259470 | 9/2001 |
| JP | 2001-296607 A | 10/2001 |
| JP | 2002-189251 | 7/2002 |
| JP | 2003-195420 | 7/2003 |
| WO | WO 94/12282 | 6/1994 |
| WO | WO 2003/083574 | 10/2003 |

OTHER PUBLICATIONS

Supllemental European Search Report, issued in European Patent Application No. 03778848.6-2209, dated on Feb. 15, 2008.

*Primary Examiner*—Rochelle-Ann Blackman
(74) *Attorney, Agent, or Firm*—McDermott Will & Emery LLP

(57) ABSTRACT

An ion wind generator is arranged in the vicinity of a light source. The ion wind generator allows an air flow by negatively ionizing air by corona discharges using negative side needle electrodes, and drawing the negatively-ionized air using a ground side mesh electrode. High-temperature air surrounding the light source is drawn by the air flow and exhausted from an exhaust port at a rear side of a casing. An ozone decomposition catalyst filter is provided in the exhaust port. Ozone ($O_3$) is generated by the corona discharges in the ion wind generator. However, the ozone is decomposed by passing through the ozone decomposition catalyst filter provided at the exhaust port.

8 Claims, 5 Drawing Sheets

U.S. PATENT DOCUMENTS

| | | |
|---|---|---|
| 4,812,711 A | 3/1989 | Torok et al. |
| 5,012,159 A | 4/1991 | Torok et al. |
| 5,180,404 A | 1/1993 | Loreth et al. |
| 6,056,405 A * | 5/2000 | Heintz et al. .................. 353/85 |
| 2002/0140907 A1 * | 10/2002 | Fujimori ...................... 353/31 |
| 2005/0077103 A1 * | 4/2005 | Ikeda et al. ................. 181/225 |
| 2005/0213048 A1 * | 9/2005 | Ikeda et al. .................... 353/57 |
| 2005/0237500 A1 * | 10/2005 | Ishii et al. ................... 353/122 |

* cited by examiner

PROJECTION TYPE IMAGE DISPLAY UNIT

TECHNICAL FIELD

The present invention relates to a projection type video display such as a liquid crystal projector, and the like.

PRIOR ART

A projection type video display is so configured that light emitted from a light source is modulated by a light valve such as a liquid crystal panel, and the like, and projected, so that it is necessary to comprise a high-luminance light source. Consequently, measures to prevent heat generated from the high-luminance light source itself and heat generated when light is absorbed in a light polarizer in the liquid crystal panel or various types of optical components are required. Conventionally, a projection type video display has a structure in which air is taken in and exhausted, and the heat is released from a casing by rotating a fan with a motor (see JP-A-2001-222065).

However, in a suction and exhaust mechanism using motor driving, noises are produced due to suction and exhaust sound by rotating sound of a motor and hissing sound of a fan. As a result, the noise produced by the suction and exhaust sound is offensive to the ear when a projector is used. On the other hand, it is desirable that a fan is used in a case where a light valve heated to high temperature is cooled by blowing air thereto. However, if dust in the air adheres to the light valve, a quality of image is lowered, so that a filter is needed. The filter becomes a primary factor that lowers a blowing capability.

SUMMARY OF THE INVENTION

In view of the foregoing circumstances, it is an object of the present invention to provide a projection type video display provided with a mechanism capable of taking in and exhausting air without using a fan or being utilized as a dust removal device by using the fan at the same time.

In order to solve the above-mentioned problem, a projection type video display according to the present invention is a projection type video display that modulates light emitted from a light source by a light valve and projects the modulated light, and comprises an ion wind generator for generating air flow by ionizing air and molecules in the air using an electrode on one side and drawing ions generated by the ionization by an electrode on the other side, and an ozone removal filter provided on a path of the air flow.

With the above-described configuration, the ion wind generator allows the air flow to be occurred by electrically moving an ionized air, and the like. As a result, different from blowing by the rotation of a fan, no rotation noise is produced, so that, when air is taken in or exhausted, an almost soundless state is made possible. Moreover, even if ozone is generated by the ionization, the ozone is removed by the ozone removal filter.

An ozone removal filter may be provided on a path of the air flow warmed by drawing heat generated in the video display. Furthermore, the ozone removal filter may be provided in a position on a path of the air flow and in the vicinity of a light source. A reflector composing the light source transmits infrared light and the infrared light may be guided to the ozone removal filter. Such the configurations are useful in a case where the ozone removal filter is required to be heated to high temperature in some degree for sufficient demonstration of a removal capability.

The ion wind generator may be so provided as to take air outside of the video display into the video display. Furthermore, in this configuration, if a mechanism in which dust is caught by the electrode on the other side of the ion wind generator is utilized, the ion wind generator becomes a dust removal device. When the ion wind generator is used as the dust removal device and used together with a fan, dust removal is possible without reducing a blowing capability of the fan. Moreover, the ozone is removed by the ozone removal filter.

It is preferable that a projection type video display comprises a sensor for detecting temperature or ambient temperature of the ozone removal filter and a control means for turning on the ion wind generator when the temperature is equal to or higher than predetermined temperature and turning off the ion wind generator when the temperature is lower than the predetermined temperature. With this configuration, since it is possible to send an air after reaching a stage that an ozone removal capability of the ozone removal filter is fully demonstrated, ventilation of generated ozone outward the video display is reduced as much as possible.

Moreover, it is desirable that the ion wind generator is turned on or off when a predetermined time period has passed after the light source was turned on or off. Also in this configuration, it is possible to send an air after reaching the stage that the ozone removal capability of the ozone removal filter is fully demonstrated, the ventilation of the generated ozone outward the video display is reduced as much as possible.

BEST MODE FOR PRACTICING THE INVENTION

Embodiment 1

Hereinafter, a projection type video display according to an embodiment of the present invention will be described referring to FIGS. 1 to 3.

Figure 1:
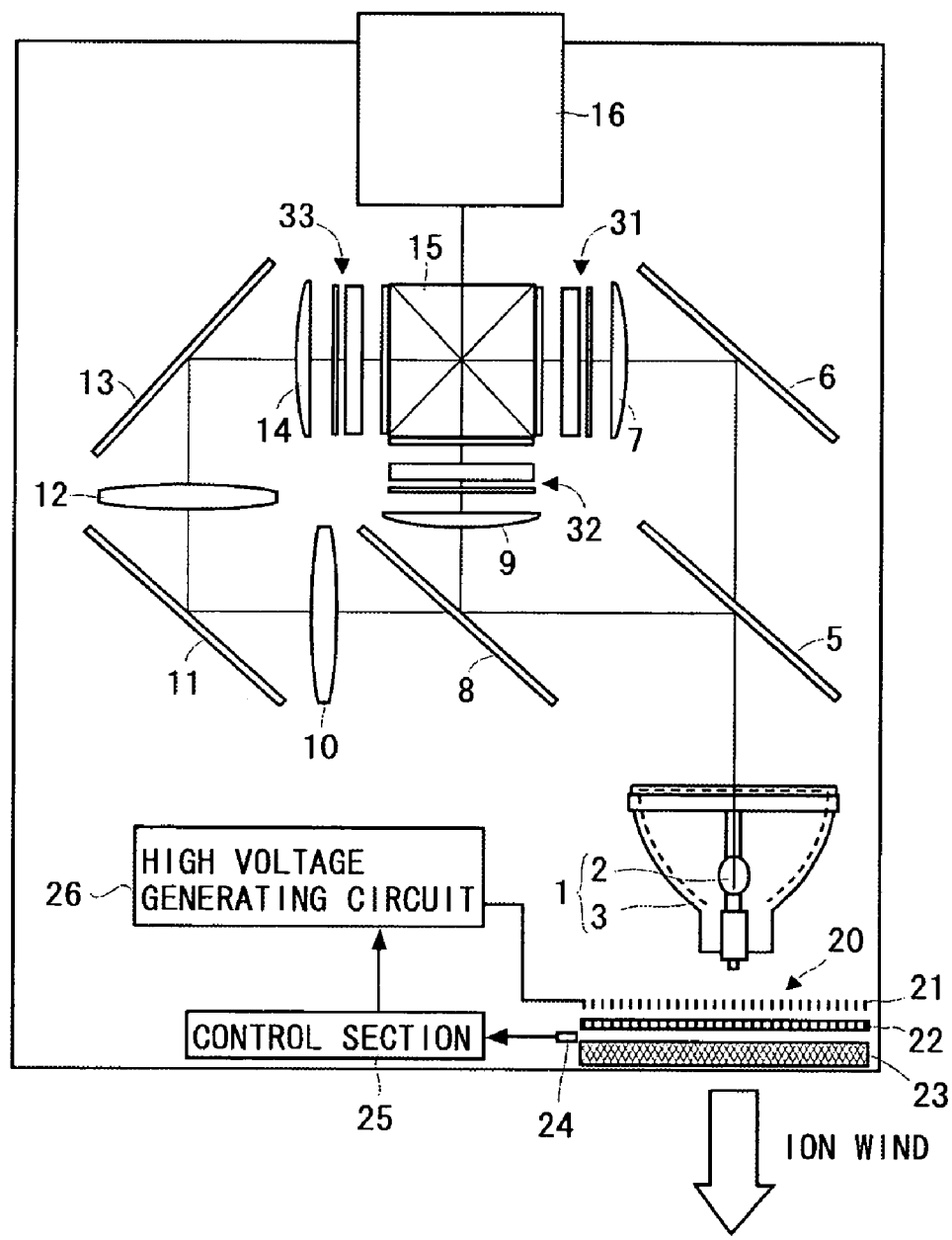
FIG. 1 is a diagram showing a projection type video display according to an embodiment of the present invention.
Figure 2:
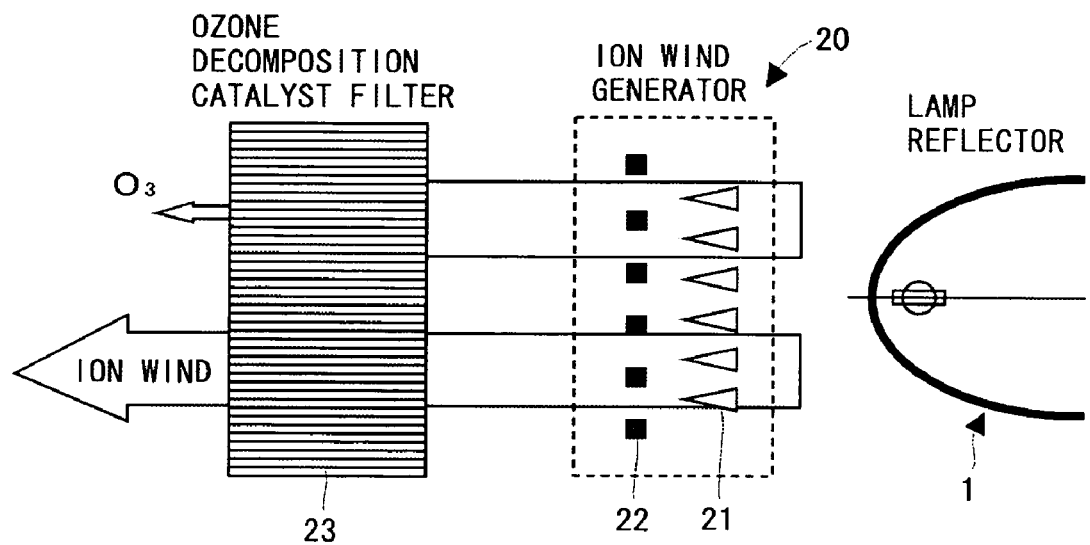
FIG. 2 is a descriptive diagram showing a configuration of an ion wind generator.

FIG. 1 is a diagram showing an optical system of a three-panel color liquid crystal projector. A light emitter 2 of a light source 1 is composed of an ultra-high pressure mercury lamp, a metal halide lamp, a xenon lamp, and the like, and light irradiated therefrom is emitted after being changed into parallel light by a parabolic reflector 3, for example.

A first dichroic mirror 5 transmits light in a red wavelength band, while reflecting light in a cyan (green+blue) wavelength band. The light in the red wavelength band which passes through the first dichroic mirror 5 is reflected by a reflection mirror 6 so that its optical path is changed. The red light which is reflected by the reflection mirror 6 is optically modulated by passing through a transmission type liquid crystal light valve for red light 31 through a condenser lens 7. On the other hand, the light in the cyan wavelength band which is reflected by the first dichroic mirror 5 is guided to a second dichroic mirror 8.

The second dichroic mirror 8 transmits light in a blue wavelength band, while reflecting light in a green wavelength band. The light in the green wavelength band which is reflected by the second dichroic mirror 8 is guided to a transmission type liquid crystal light valve for green light 32 through a condenser lens 9 to be optically modulated by passing through the liquid crystal light valve for green light 32. In addition, the light in the blue wavelength band which passes through the second dichroic mirror 8 is guided to a transmission type liquid crystal light valve for blue light 33 through reflection mirrors 11 and 13, relay lenses 10 and 12, and a condenser lens 14, to be optically modulated by passing through the liquid crystal light valve for blue light 33.

Each of the above-described liquid crystal light valves 31, 32, and 33 comprises an incidence-side polarizer, a panel constructed by sealing a liquid crystal between a pair of glass plates (where a pixel electrode and an alignment film are formed), and a light exit side polarizer. Modulated light (image light in respective colors) which has been respectively modulated by passing through the liquid crystal light valves 31, 32, 33 are combined by a dichroic prism 15, to be a color image light. The color image light is projected by a projection lens 16 and is displayed on a screen (not shown).

An ion wind generator 20 is provided at the back of the light source 1. As shown also in FIG. 2, the ion wind generator 20 negatively ionizes air and molecules by corona discharges using negative-side, a multiplicity of needle electrodes 21 and draws the negatively-ionized air and molecules to a ground-side mesh electrode 22 to produce air flow. A high-voltage generating circuit 26 receives voltage supply from a power supply (not shown) to generate a high voltage ranging from a few minus kilovolts to minus ten and several kilovolts and applies the high voltage to the electrodes 21.

Moreover, as shown in FIG. 1, an air supply port of the ion wind generator 20 faces an exhaust port at a rear surface of a casing. When the air flow generated by the ion wind generator 20 is exhausted outward from the projector, the ambient air heated to high temperature by the heat produced by the light source 1 is drawn and exhausted out of the projector on the air flow.

An ozone decomposition catalyst filter 23 is provided in the exhaust port at the rear surface of the casing. The ozone decomposition catalyst filter 23 is constructed by additionally attaching a catalyst such as a manganese dioxide, a nickel oxide, and others, to a ventilation supporting body in a honeycomb shape. Ozone ($O_3$) is generated by corona discharges in the ion wind generator 20. The ozone is guided to the outside of the projector on air flow, and the ozone is decomposed by passing through the ozone decomposition catalyst filter 23 provided in the exhaust port.

A certain level of temperature is needed for the ozone decomposition catalyst filter 23 to fully demonstrate an ozone decomposition capability. In the above-described configuration, the ambient air heated to high temperature by the heat of the light source 1 is exhausted out of the projector on the air flow, and the heat of high-temperature air is applied to the ozone decomposition catalyst filter 23. As a result, temperature of the ozone decomposition catalyst filter 23 increases, and the ozone decomposition capability of the ozone decomposition catalyst filter 23 is increased. Furthermore, if a cold lamp (a type in which a reflector transmits infrared rays) is used as the light source 1, the temperature of the ozone decomposition catalyst filter 23 is increased also by the infrared rays emitted from the light source 1. As a result, the ozone decomposition capability is increased (An infrared rays reflecting mirror and the like, may be provided so as to positively guide the infrared rays emitted from the light source 1 to the ozone decomposition catalyst filter 23.). However, immediately after the light source was lighted, the temperature of the ozone decomposition catalyst filter 23 is equal to room temperature, so that it is impossible that the ozone decomposition capability is fully demonstrated. Therefore, such control as described below is performed. For this purpose, a temperature sensor 24 and a control section 25 are provided.

The temperature sensor 24 detects the temperature of the ozone decomposition catalyst filter 23 or ambient temperature thereof. The result of detection (voltage value) is sent to the control section 25. The control section 25 issues an on-command to the high-voltage generating circuit 26 so as to activate the ion wind generator 20 when the detected temperature is equal to or higher than predetermined temperature, and on the other hand, issues an off-command to the high-voltage generating circuit 26 so as to stop the ion wind generator 20 when the detected temperature is lower than the predetermined temperature. Though the predetermined temperature varies depending on a catalyst which is used or on heat-resistance temperature of optical devices in the projector, the temperature may be set to around from 70 degrees centigrade to 90 degrees centigrade, for example.

Figure 3:
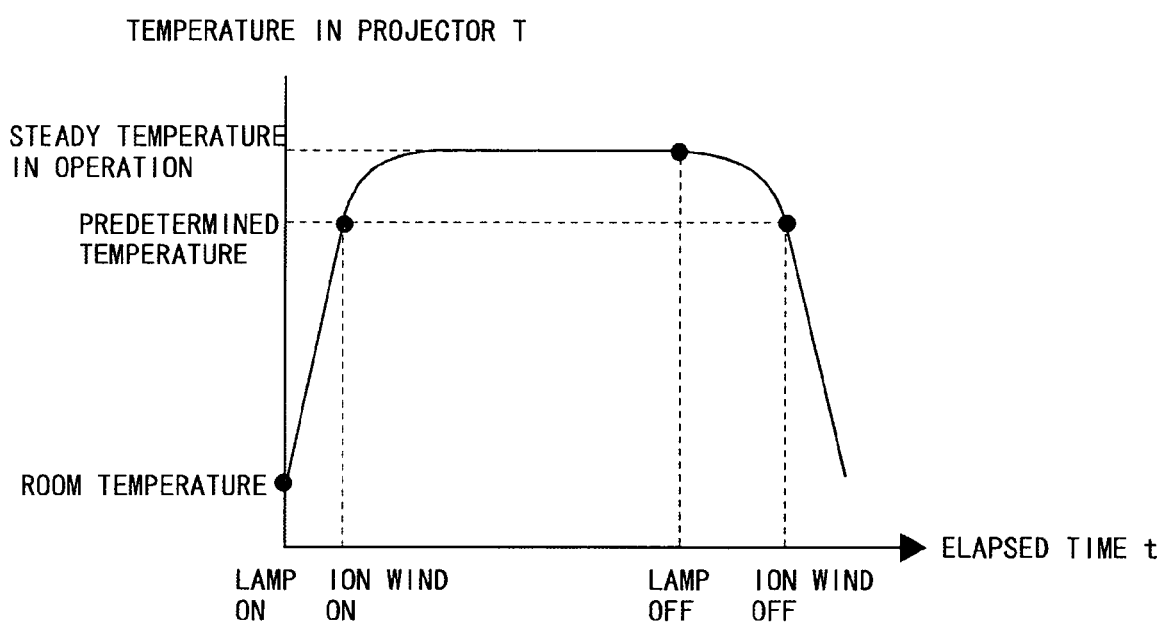
FIG. 3 is a descriptive diagram showing on/off control of an ion wind generator.

FIG. 3 shows, in addition to an elapse of time period and a change in temperature in the projector, on and off timing of the light source 1 and the on and off timing of the ion wind generator 20. The temperature in the projector immediately after the light source 1 was turned on is equal to room temperature. Afterward, however, the temperature in the projector is increased by the heat generated by the light source 1 and also the temperature of the ozone decomposition catalyst filter 23 is increased. When the detected temperature is equal to or higher than the predetermined temperature, the ion wind generator 20 is turned on, so that the temperature in the projector is kept at a steady temperature by cooling with ion wind. Furthermore, immediately after the light source 1 was turned off, the temperature in the projector is still high, accordingly the temperature of the ozone decomposition catalyst filter 23 is high. Therefore, an on-state of the ion wind generator 20 is maintained for a while, and when the detected temperature drops to less than the predetermined temperature, the ion wind generator is tuned off. Thus, the ion wind generator 20 is turned on and off depending on temperature detection. Accordingly, since it is possible to send an air after reaching the stage that the ozone removal capability of the ozone decomposition catalyst filter 23 is fully demonstrated, the ventilation of generated ozone out of the projector is reduced as much as possible.

In the above-described configuration, the high-temperature air surrounding the light source 1 is drawn using the ion wind generated by the ion wind generator 20, and guided to the outside of the projector. However, the ion wind generated by the ion wind generator 20 may be blown onto the light source 1. In this case, it is preferable that the ozone decomposition catalyst filter 23 is arranged in the close vicinity of a reflector 3 of the light source 1. In addition, the configuration in which the ion wind generator 20 is arranged in the vicinity of the light source 1 is shown. However, the present invention is not limited to the same. The ion wind generator may be arranged at another location where air is heated to high temperature (the location near a liquid crystal display panel, etc). Furthermore, a positive-negative relationship between an electrode on one side and an electrode on the other side in the ion wind generator may be reversed. Moreover, as far as the ion wind generator is so constructed that the air flow is generated by ionization of air or molecules in the air, the ion wind generator different from the above-described specific structure may be used. Also in the above-described example, the temperature sensor 24 measures the temperature or the ambient temperature of the ozone decomposition catalyst filter 23 and operates the ion wind generator 20. However, after the light source 1 was turned on, a measuring by a timer is performed, and when predetermined period passes, the ion wind generator 20 may be turned on, for example. Or, after the light source 1 was turned off, the measuring by a timer is performed, and when the predetermined period passes, the ion wind generator 20 may be turned off. Also in such the configurations, it is possible to send the air after reaching the stage that the ozone removal capability of the ozone decomposition catalyst filter 23 is fully demonstrated, the ventilation of generated ozone out of the projector is reduced as much as possible.

Embodiment 2

Hereinafter, a fan 200 (hereinafter, referred to as a dust collection wind fan 200) with the ion wind generator provided in the projection type video display of an embodiment of the present invention will be described with referring to FIGS. 4 to 5.

Figure 4:
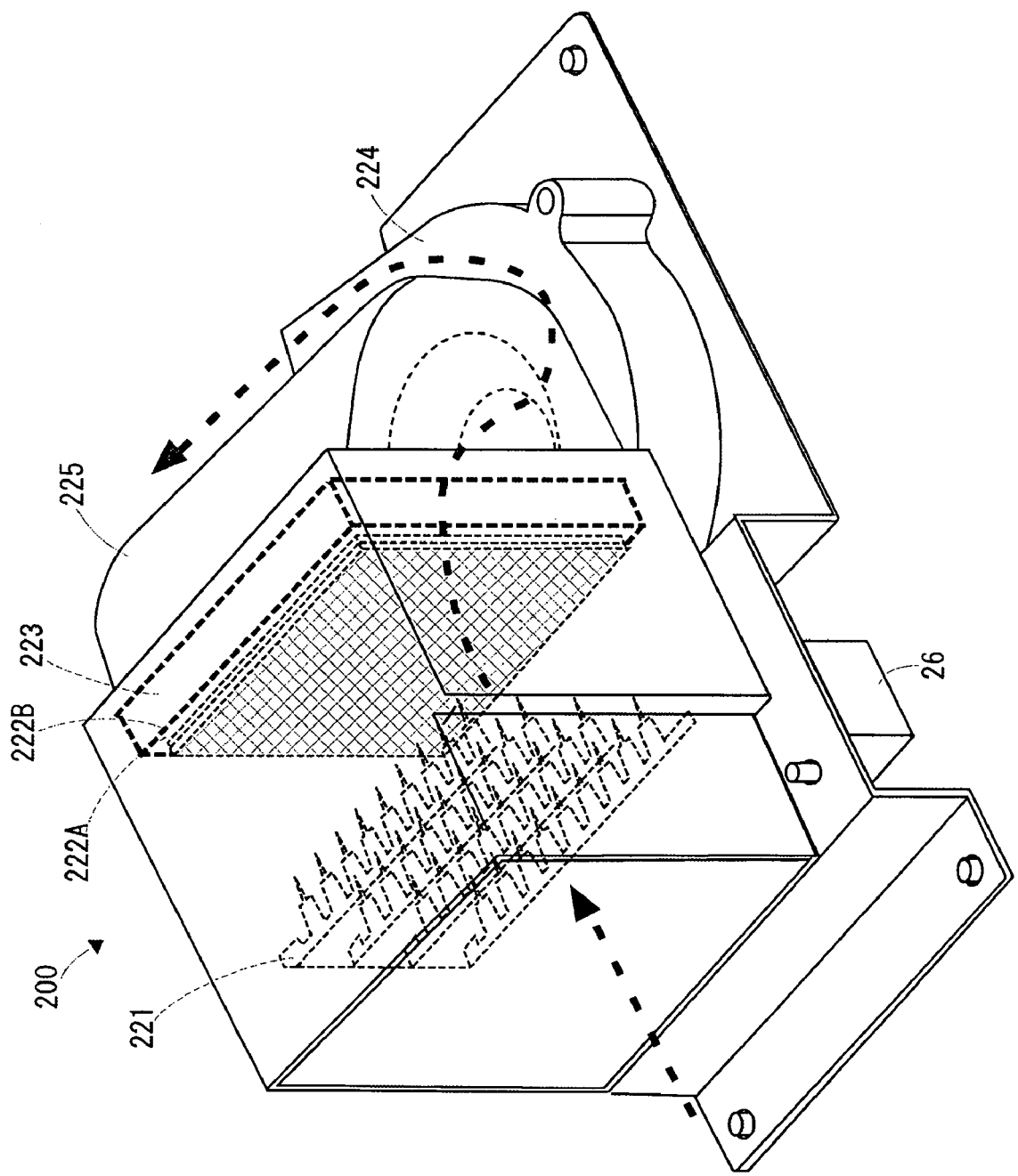
FIG. 4 is a perspective (partly transparent) view showing a dust collection wind fan.

FIG. 4 is a perspective view (partly transparent) showing the dust collection wind fan 200. The dust collection wind fan 200 comprises a dust collection portion (ion wind generator) and a wind fan portion (sirocco fan).

The dust collection wind fan 200 is constructed by arranging needle electrodes 221, a first mesh electrode 222A and a second mesh electrode 222B, and an ozone decomposition catalyst filter 223 in a rectangular cylinder in the above-mentioned order in the direction of air flow. The dust collection wind fan 200 negatively ionizes air, dust, and the like, by corona discharges using a multiplicity of negative-side needle electrodes 221, and generates air flow by drawing the negatively-ionized air, dust, and the like, using ground-side first and second mesh electrodes 222A and 222B, in addition, catches dust using the mesh electrode 222B. The ozone decomposition catalyst filter 223 is constructed by attaching a catalyst such as a manganese dioxide, a nickel oxide, an activated carbon, and the like, to the inner surface of each hole in a honey-comb shape. Even if ozone ($O_3$) is generated by the corona discharges, the generated ozone is decomposed and removed before being guided to a sirocco fan 224 by passing through the ozone decomposition catalyst filter 223. The high-voltage generating circuit 26 receives voltage supply from a power supply (not shown) to generate a high voltage ranging from a few minus kilovolts to minus ten and several kilovolts and applies the high voltage to the electrodes 221.

The sirocco fan 224 takes in and blows the air flow cleaned by the dust collection portion through a hood portion (elbow portion) 225. The sirocco fan 224 takes in air in the direction of axis of fan rotation, and exhausts the air in the direction perpendicular to the direction of axis of fan rotation.

A diameter of a mesh aperture (in case of a round shape) or a length of one side (in case of a square shape) of the first mesh electrode 222A is set to several millimeters, for example. The diameter of a mesh aperture (in case of the round shape) or the length of one side (in case of the square shape) of the second mesh electrode 222B is set to a size approximately 10 times as large as that of a pixel of a liquid crystal display panel (10~20 um), for example. Dust collection is mainly performed by the second mesh electrode 222B. The first mesh electrode 222A is fixedly arranged inside the rectangular cylinder. On the other hand, the second mesh electrode 222B and the ozone decomposition catalyst filter 223 are arranged removably from the rectangular cylinder. This enables the second mesh electrode 222B and the ozone decomposition catalyst filter 223 to be replaced or to be removed and put back after being cleaned. Furthermore, even if electric power is supplied to the needle electrodes 221 by mistake with the second mesh electrode 222B being removed, the first mesh electrode 222A exists inside the rectangular cylinder, so that it is possible to prevent a malfunction caused by nonexistence of the other electrode for discharge.

Figure 5:
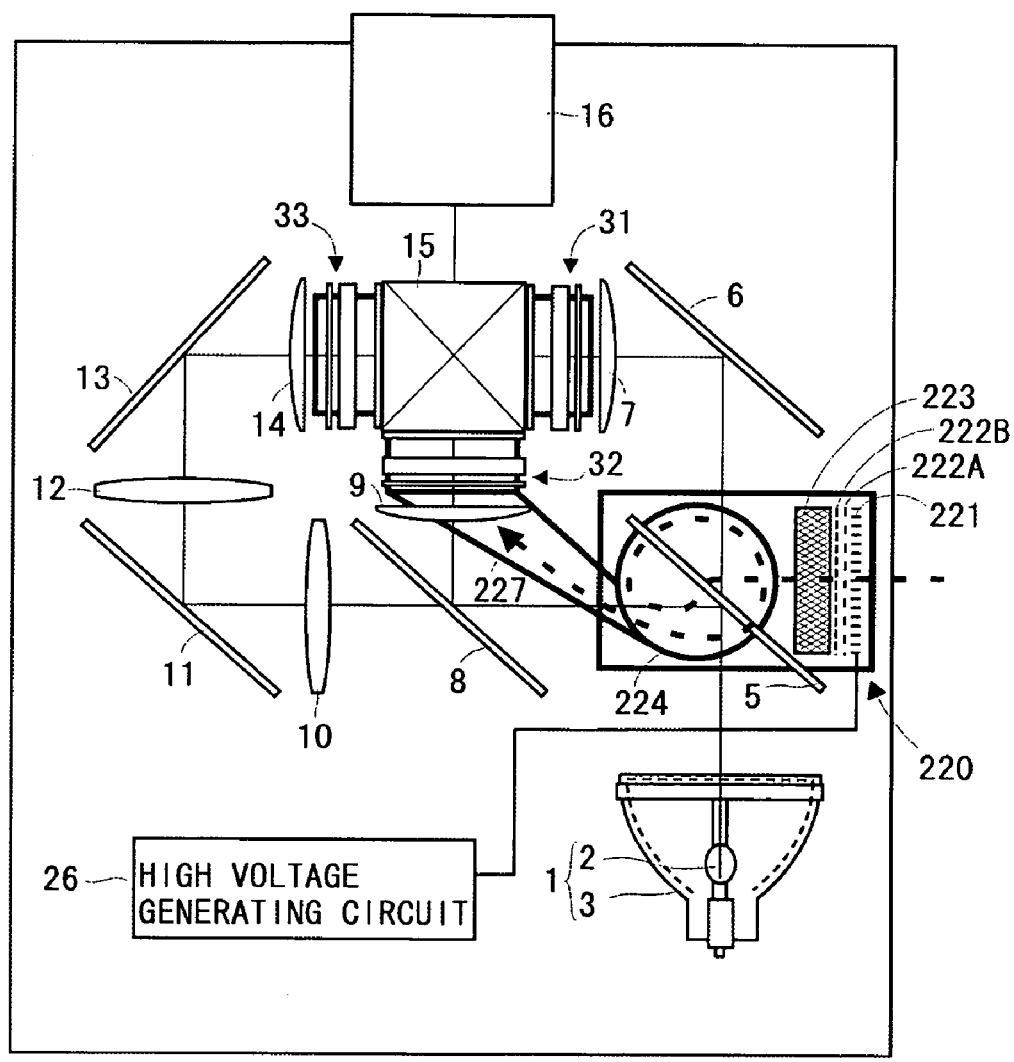
FIG. 5 is a descriptive diagram showing an arrangement example of a dust collection wind fan.

The dust collection wind fan 200 in the configuration of above-described FIG. 4 is arranged on a lower side of an image light generating optical system as shown in FIG. 5, for example. A duct 227 is provided in the air supply port of the sirocco fan 224. The tip of the duct 227 is divided into three and the respective apertures on the three tips are located on the lower side of the liquid crystal valves 31, 32, and 33, and wind is blown toward the light valves located on an upper side of the apertures. By taking the second electrode 222B and the ozone decomposition catalyst filter 223 in the dust collection portion out of a bottom side of the liquid crystal projector, the replacement thereof is made possible.

As for the mesh electrode in the above-described configuration, it is possible to make a width of the aperture sufficiently larger than a size of the pixel of the liquid crystal panel, thereby a resistance is reduced. Moreover, an air flow is generated by the dust collection portion (the ion wind generator) in a direction of air suction of the sirocco fan 224. These two effects reduce a resistance against a stream of air toward the sirocco fan 224, and prevent dust from entering. Ozone ($O_3$) is generated by the corona discharges in the dust collection portion, and the ozone is guided to the liquid crystal light valves 31, 32, and 33 on the air flow. However, the ozone is decomposed by passing through the ozone decomposition catalyst filter 223.

Also in this configuration of Embodiment 2, same as in Embodiment 1, it is preferable to perform the on and off control of the ion wind generator (dust collection portion) or the on and off control of the whole dust collection wind fan 200. The ozone decomposition catalyst filter 223 gets fresh air, so that the increase in temperature is lower than Embodiment 1. However, the temperature in the projector is increased by the heat emitted by the light source, etc. Accordingly, the temperature of the ozone decomposition catalyst filter 223 is also increased. Therefore, by detecting the temperature or counting an elapse of time period from the point of the on of the light source, the temperature increase in the ozone decomposition catalyst filter 223 is waited, and after the temperature of the ozone decomposition catalyst filter 223 increased, the ion wind generator (dust collection port) or the whole dust collection wind fan 200 may be turned on.

The ozone decomposition catalyst filter 223 may be placed at the exhaust side where air is exhausted after the heat of the liquid crystal valves 31, 32, and 33 is drawn by cooling air.

In such the configurations, the video generating optical system using three transmission-type liquid crystal display panels is shown, however the present invention is not limited to the same. The present invention is adaptable to a case where another image generating optical system is used.

What is claimed is:

1. A projection type video display that modulates light emitted from a light source by a light valve and projects the modulated light, comprising:
    an ion wind generator including a first electrode for ionizing air and molecules in the air and a second electrode for drawing ions generated by the first electrode so as to generate air flow; and
    an ozone removal filter provided on a path of the air flow.

2. A projection type video display according to claim 1, wherein the ozone removal filter is provided on a path of the air flow warmed by drawing heat generated in the video display.

3. A projection type video display according to claim 1, wherein the ozone removal filter is provided in a position on a path of the air flow and in the vicinity of the light source.

4. A projection type video display according to claim 3, wherein a reflector composing the light source transmits infrared light and the infrared light is guided to the ozone removal filter.

5. A projection type video display according to claim 1, wherein the ion wind generator is so provided as to take air outside the video display into the video display.

6. A projection type video display according to claim 5, wherein dust is caught by the electrode on the other side of the ion wind generator.

7. A projection type video display according to any one of claims 1 to 6, comprising:

a sensor for detecting temperature or ambient temperature of the ozone removal filter; and a control means for turning on the ion wind generator when the temperature is equal to or higher than predetermined temperature and turning off the ion wind generator when the temperature is lower than the predetermined temperature.

8. A projection type video display according to any one of claims 1 to 6, wherein the ion wind generator is turned on or off when a predetermined time period has passed after the light source was turned on or off.

* * * * *